Feb. 18, 1941.    C. W. HLAVAC ET AL    2,232,236
DENTAL MATRIX HOLDER
Filed March 7, 1940
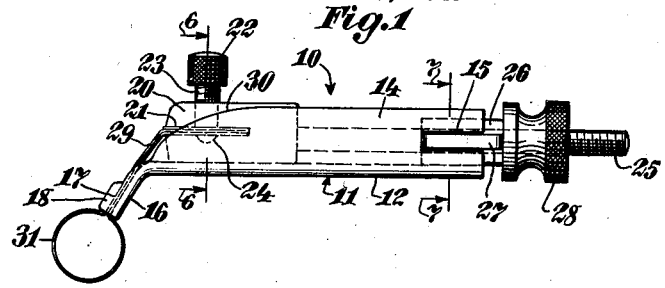
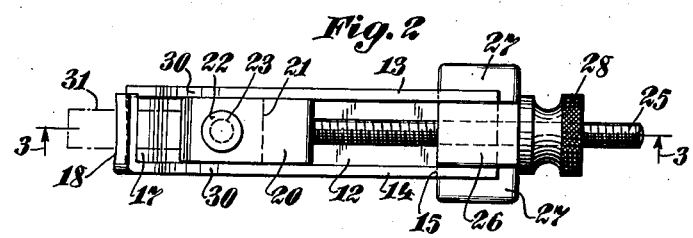
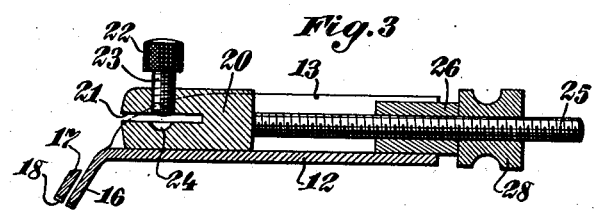
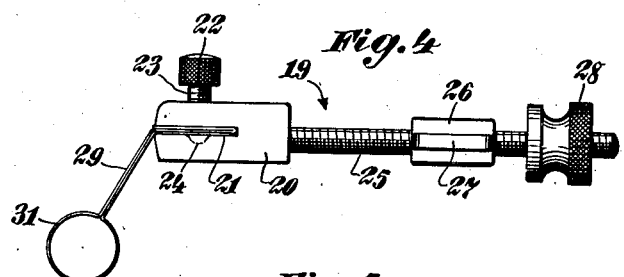
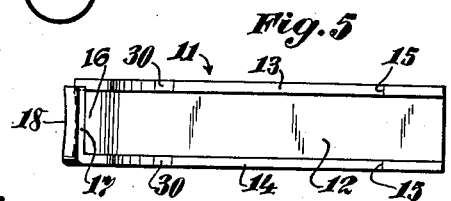
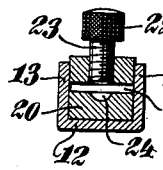 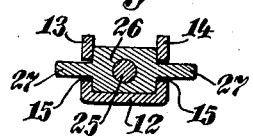
Charles W. Hlavac and Thomas Hill INVENTORS
BY Weis Shumacher ATTORNEY.

Patented Feb. 18, 1941

2,232,236

UNITED STATES PATENT OFFICE 2,232,236

DENTAL MATRIX HOLDER

Charles W. Hlavac and Thomas Hill,
New York, N. Y.

Application March 7, 1940, Serial No. 322,672

4 Claims. (Cl. 32—63)

This invention relates to devices such as dental matrix holders.

One object of the invention is to provide a dental matrix holder having improved means for the accurate and reliable forming of a dental matrix, with the securement of the dental foil in a powerful manner and with the device permitting a convenient and superior manipulation such that the resultant matrix shall be correct in all respects.

Another object of the invention is to furnish a dental matrix holder having improved means such that the tensioning portion coacts in a novel manner with the guide portion for removal therefrom, with the dental matrix undisturbed for subsequent detachment.

Another object of the invention is to construct a dental matrix holder wherein a base portion forms a guide for both the dental foil and the holding and tensioning portion for said foil to thus facilitate the operation of the device.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view of a dental matrix holder embodying the invention, and showing a strip of dental foil held thereby.

Fig. 2 is a top plan view thereof, but with the dental foil shown in dot-dash lines.

Fig. 3 is a sectional view taken on the line 3—3 of Fig. 2, but with the dental foil omitted.

Fig. 4 is a side view showing the holder portion of the device separated from the guide thereof and with the dental foil in position after having been applied to a tooth.

Fig. 5 is a top plan view of the guide portion of the device.

Figs. 6 and 7 are sectional views taken respectively on the lines 6—6 and 7—7 of Fig. 1.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, in the filling of a cavity in a tooth or in the taking of impressions with respect to a tooth, a dentist may employ a strip of soft metal foil which may be passed around the tooth under considerable tension to form a perfect circle or matrix conforming to the form or shape of the sides of the tooth. The present invention is intended to facilitate the formation of such a matrix, and in consequence provides a structure for securely holding a loop of the dental foil, and for controllably tensioning the same while in the form of a circle, with the strip moving and being accurately guided in its movement to snugly conform to the shape of the tooth. The device comprises two main parts, of which one is a base and guide member for the foil and for the other part which is a holding and tensioning member for the foil. These parts are separably coordinated in an improved manner to facilitate removal of the matrix without disturbing the same.

Referring in detail to the drawing, 10 denotes a dental matrix holder embodying the invention. The same may comprise a base or body portion 11 which may function as a guide for a holder and tensioning means for the dental foil as hereinafter described. The body portion 11 may be of straight channel form comprising a bottom wall 12 and side flanges 13 and 14. Opposite ends of the channel are fully open, and at one end thereof the said flanges are provided with aligned open ended slots or recesses 15. At the opposite or forward end the body portion is formed with a rigid depending dental foil guide which may comprise a finger or flange 16 integrally connected to the flange 14 and projecting toward the companion flange 13. Cooperating with the finger 16 is a depending lip portion 17 which is integral with the bottom wall 12, the arrangement being such that the elements 16 and 17 furnish a guide for the dental foil open at one end for free and convenient removal and insertion of a folded strip of dental foil. At its extreme lower edge the guide elements 16 and 17 may be slightly concaved as shown at 18 so as to be adapted to snugly fit the side of a tooth to assure the closest possible approach or contact with the tooth.

Co-operating with the body portion 11 is a combined holder and tensioning means 19 which is removably engaged with the former. It may comprise a head 20 having therethrough a transverse foil receiving slot 21 which may be intersected by a screw 22 operated by a head 23, and there being a recess 24 in the lower face of the slot in alignment with the screw. Rigidly connected to the head 20 is a rod 25 which may be threaded throughout the length thereof. Slidably carried by the rod 25 is an abutment member 26 having a hole therethrough for the free passage of the rod 25 and having opposite lateral projections or wings 27. At its remote free end a nut 28 may be threadedly engaged with the rod 25.

When the portions 11 and 19 are combined, the head 20 is snugly received in the channel member 11 with the abutment member disposed at a remote end of the body portion 11 and with the wings 27 extending into the slots 15 in abutment with the closed ends thereof. It will now be perceived that upon operating the nut 28, the rod 25 and hence the head 20, may be caused to move toward the right to exert tension upon the dental foil.

In use, a strip of extremely thin soft dental foil 29 having a suitable degree of tensile strength is folded in half and the free end portions thereof inserted in superimposed relation to each other into the slot 21 of the head 20. Then the screw 22 is manipulated to cause it to press downward upon the foil 29 and to dent it into the recess 24 so as to afford a powerful securement. While the dental foil 29 is being thus secured, the holder portion 19 may remain separated from the base or body portion 11. The folded strip of dental foil 29 may now be laterally slipped into the guide 16, 17 through the open end thereof, this movement being facilitated by the cut away portions 30 of the base 11 whereby obstruction of the head 20 is avoided. Now the head 20 is merely tilted into the guide member 11 and the abutment member 26 is moved rearward and then forward to engage the wings 27 thereof in the slots 15. The lower or fold portion of the dental foil 29 may now be engaged around the tooth, and upon operating the nut 28, the head 20 is caused to apply tension to the dental foil, causing it to move upward through the guide 16, 17 to thus securely tension the dental foil around the tooth to thus obtain the true circumference and configuration of the tooth because the dental foil is highly flexible and the guide therefor is in direct abutment with the side of the tooth. The resultant loop 31 thus forms a true matrix for the tooth.

To remove the matrix 31 without upsetting the same, the nut 28 may be loosened and the abutment member 26 moved rearward and disengaged from the guide member 11, whereupon the head 20 may be removed from the latter and the dental foil slid outward laterally from the guide 16, 17, substantially as indicated in Fig. 4. Now the matrix may be very delicately separated from the head 20 by loosening the screw 23.

We claim:

1. A dental matrix forming device having an elongated base member constituting a longitudinal guide, said base member having at its forward end a laterally open dental foil guide, said base member having at its rear end an abutment portion, a head slidable along the base member and having means for securing the dental foil to the head, an abutment element at said rear end, a screw means interconnecting the head and the abutment element for causing movement of the head to tension the dental foil, and means interengaging said abutment portion and said abutment element comprising male and female portions removably interengaging each other along a plane generally parallel to the screw means, said head and screw means and abutment element being otherwise free of the base member and constituting an interconnected unit directly removable from the base member upon loosening the screw means, without disconnecting the dental foil from the head, whereby said unit constitutes a handle for the dental foil matrix produced, said abutment element being normally stationary and the male and female portion being held interengaged by tension of the screw means between the head and abutment element.

2. A dental foil matrix forming device, including an elongated base member of channel form, said base member having at its front end a laterally open dental foil guide, the flanges of the base member having abutment portions at the rear end of the base member, a head slidably seated in the channel, and adapted for securement thereto of the dental foil, an abutment element at said rear end of the base member, a screw means interconnecting the head and the abutment element for causing tensioning of the dental foil, the abutment element having a central female portion for receiving the screw means and having laterally extending sections, the sections and the abutment portions of the flanges comprising male and female releasably interengaging portions including open ended slots extending along the plane of the screw means, said head and screw means and abutment element constituting a unit that is otherwise free of the base member and is directly removable therefrom upon disengagement of the said abutment element, with the removed unit forming a holder for dental foil connected thereto, said abutment element being normally fixed and being held in position by tension of the screw means exerted to tension the dental foil.

3. A dental foil matrix forming device, including a sheet metal base member providing a channel section and a dental foil guide at one end integral therewith and formed by a U-shaped portion spaced in advance of said section, a head slidable in the channel, an abutment element, a screw means interconnecting the head and the abutment element, comprising a screw fixed to the head, and a nut for the screw, the abutment element having a body portion having an opening freely receiving the screw, the abutment element having laterally extending wings, the flanges of the base member having open ended slots at the end thereof opposite to that of the dental foil guide, said wings being removably seated in said slots with the body portion of the abutment element being received between said flanges, said head and abutment element and screw means forming a unit that is otherwise free of the base member and is removable as a unit with the matrix attached thereto, said abutment element being normally stationary and the wings being held in the slots solely by the screw means in exerting tension on the dental foil.

4. A dental foil matrix forming device, including an elongated base member of channel form, said base member having at its front end a laterally open dental foil guide, the flanges of the base member having abutment portions at the rear end of the base member, a head slidably seated in the channel and adapted for securement thereto of the dental foil, an abutment element at said rear end of the base member, a screw means interconnecting the head and the abutment element for causing tensioning of the dental foil, the screw means having a screw and nut, the abutment element having a body portion having a hole freely receiving the screw, and having laterally extending wings, the abutment portions of the flanges having open ended slots along the plane of the screw means for receiving the wings, the body portion being guidingly received in said channel, the head, abutment element and screw means forming a unit that is otherwise free of the base member and is removable therefrom as a unit with the dental foil attached to the unit, the abutment element being normally stationary with the wings abutting the closed ends of the slots due to the tension of the screw means in tensioning the dental foil.

CHARLES W. HLAVAC.
THOMAS HILL.